United States Patent
Irie et al.

(10) Patent No.: US 9,841,746 B2
(45) Date of Patent: Dec. 12, 2017

(54) NUMERICAL CONTROLLER HAVING FUNCTION OF CONTROLLING SPEED BY SUPERIMPOSED CONTROL

(71) Applicant: FANUC Corporation, Minamitsuru-gun, Yamanashi (JP)

(72) Inventors: Kouhei Irie, Minamitsuru-gun (JP); Akira Kanemaru, Minamitsuru-gun (JP); Yasushi Takeuchi, Minamitsuru-gun (JP)

(73) Assignee: FANUC CORPORATION, Minamitsuru-gun, Yamanashi (JP)

( * ) Notice: Subject to any disclaimer, the term of this patent is extended or adjusted under 35 U.S.C. 154(b) by 275 days.

(21) Appl. No.: 14/728,055

(22) Filed: Jun. 2, 2015

(65) Prior Publication Data
US 2015/0355624 A1  Dec. 10, 2015

(30) Foreign Application Priority Data

Jun. 6, 2014 (JP) .................................. 2014-117392

(51) Int. Cl.
G05B 19/19 (2006.01)
G05B 15/02 (2006.01)

(52) U.S. Cl.
CPC .............. *G05B 19/19* (2013.01); *G05B 15/02* (2013.01); *G05B 2219/49001* (2013.01); *G05B 2219/49101* (2013.01)

(58) Field of Classification Search
CPC .......... G05B 19/19; G05B 2219/49101; G05B 2219/49001
See application file for complete search history.

(56) References Cited

U.S. PATENT DOCUMENTS 4,137,001 A * 1/1979 Fountain ............... B23F 21/226
                                                                407/115
4,652,804 A * 3/1987 Kawamura .......... G05B 19/416
                                                                318/573

(Continued)

FOREIGN PATENT DOCUMENTS

JP       S60-198606 A      10/1985
JP       H02-048101 A       2/1990

(Continued)

OTHER PUBLICATIONS

Notification of Reasons for Refusal dated Dec. 27, 2016 in Japanese Patent Application No. 2014-117392 (3 pages) with an English translation (2 pages).

*Primary Examiner* — Ramesh Patel
(74) *Attorney, Agent, or Firm* — Drinker Biddle & Reath LLP

(57) ABSTRACT

A numerical controller has a first axis (reference axis) and a second axis (superimposed axis), and performs superimposed control which superimposes a movement amount of the reference axis on a movement amount of the superimposed axis, and thereby controls the movement of the superimposed axis. The numerical controller controls an acceleration start time of the axis to be accelerated, in a superimposition interval in which the reference axis is accelerated and the superimposed axis is decelerated (or reference axis is decelerated and superimposed axis is accelerated). After the axis to be decelerated is sufficiently decelerated, the axis to be accelerated is accelerated, and a moving speed of the superimposed axis does not exceed a speed limit of a machine in an acceleration/deceleration interval.

4 Claims, 7 Drawing Sheets

(56) References Cited

U.S. PATENT DOCUMENTS

| | | | | | |
|---|---|---|---|---|---|
| 4,987,359 | A | * | 1/1991 | Saitoh | G05B 19/182 318/567 |
| 5,013,989 | A | * | 5/1991 | Kurakake | G05B 19/4141 318/560 |
| 5,361,472 | A | * | 11/1994 | Kubota | B23Q 5/38 29/37 A |
| 5,977,736 | A | * | 11/1999 | Nakazato | B23Q 15/013 318/568.17 |
| 6,225,772 | B1 | * | 5/2001 | Aizawa | G05B 19/416 318/571 |
| 2010/0138047 | A1 | * | 6/2010 | Bauer | G05B 19/4163 700/275 |

FOREIGN PATENT DOCUMENTS

| | | |
|---|---|---|
| JP | H03-212707 A | 9/1991 |
| JP | H04-137001 A | 5/1992 |
| JP | H10-003305 A | 1/1998 |
| JP | H10-31509 A | 2/1998 |
| JP | 2006-031077 A | 2/2006 |

* cited by examiner

NUMERICAL CONTROLLER HAVING FUNCTION OF CONTROLLING SPEED BY SUPERIMPOSED CONTROL

RELATED APPLICATION DATA

This application claims priority under 35 U.S.C. §119 and/or §365 to Japanese Application No. 2014-117392 filed Jun. 6, 2014, the entire contents is incorporated herein by reference.

BACKGROUND OF THE INVENTION

Field of the Invention

The present invention relates to a numerical controller, and particularly relates to a numerical controller which performs control for preventing instantaneous speed projection that occurs due to a difference between an acceleration time period and a deceleration time period, in a superimposed control of performing control by superimposing a movement amount of an arbitrary axis on that of another axis.

Description of the Related Art

A method of performing control by superimposing a movement amount of an arbitrary axis (reference axis) on that of another axis (superimposed axis) is generally known as "superimposed control". For instance, in an example of a machine tool having a dual path control, when a workpiece 1 mounted on a headstock 2 is worked by a first tool 3 and a second tool 4 as is illustrated in FIG. 1, the headstock 2 is moved in a ZIm-axis direction, and simultaneously the first tool 3 is moved in an XI-axis direction perpendicular to the ZIm-axis direction to work the workpiece 1; and the second tool 4 is moved in a ZIIs-axis direction parallel to the ZIm-axis direction and is simultaneously moved in an XIIs-axis direction perpendicular to the ZIIs axis to work the workpiece 1.

In this work, if the ZIIs axis is moved simultaneously with the movement of the ZIm axis, a relative position of the ZIIs axis with respect to the workpiece 1 does not change. From this fact, as for the work for the workpiece 1 by the second tool 4, a working program is previously prepared in a state in which the movement of the workpiece 1 in the ZIm-axis direction is stopped. In the actual work, superimposed control is performed which adds a movement command to the ZIm axis to a movement command to the ZIIs axis to move the ZIIs axis. The second tool 4 thereby moves relatively to the workpiece 1 according to the program command and works the workpiece 1. That is, by performing this superimposed control, the numerical controller can simultaneously execute the work for the workpiece 1 on the XI axis and the ZIm axis, and the work therefor on the XIIs axis and the ZIIs axis.

FIG. 2 is an explanatory view for position control in general superimposed control.

In the superimposed control, a movement amount $\delta_{ZIm}$ based on the movement command to the reference axis ZIm, which is determined by the numerical controller for each distribution cycle, is added to a current value register of the reference axis ZIm, coordinate values of a workpiece coordinate system of a first path are updated, and the updated values are output to a servo processing unit of the first path. On the other hand, a movement amount $\delta_{ZIIs}$ based on the movement command to the superimposed axis ZIIs is added to a current value register of the superimposed axis ZIIs, and coordinate values of a workpiece coordinate system of a second path are updated. For the superimposed axis ZIIs, a movement amount ($\delta_{ZIIs}+\delta_{ZIm}$), which is obtained by adding the movement amount $\delta_{ZIm}$ based on the movement command to the reference axis ZIm, to the movement amount $\delta_{ZIIs}$ based on the movement command to the superimposed axis ZIIs, is output to a servo processing unit of the second path. The superimposed control of the reference axis for the superimposed axis is performed according to such processing.

In the case where the superimposed control is performed, when the movement amount of the reference axis is superimposed on that of the superimposed axis, the movement amount of the superimposed axis becomes excessively large, and the moving speed occasionally exceeds a speed limit of the machine. For instance, in the case where the superimposed control is performed on the reference axis ZIm and the superimposed axis ZIIs in FIG. 1, suppose that when such a command is issued as to operate the workpiece 1 at a predetermined speed vm on the reference axis ZIm, such a command is issued as to operate the second tool 4 at a speed vs2 on the superimposed axis ZIIs, as is illustrated in FIG. 6. The moving speed of the superimposed axis ZIIs is increased to vm+vs2; however, even when vm and vs2 do not exceed the speed limits of the respective axes, vm+vs2 occasionally exceeds a speed limit vmax of the superimposed axis ZIIs.

In order to avoid such a problem, a technology of clamping the moving speed of the superimposed axis is disclosed in Japanese Patent Application Laid-Open No. 03-212707, for instance. The numerical controller which is configured on the basis of this technology decelerates the command speed of the reference axis or the superimposed axis when determining that the moving speed of the superimposed axis exceeds the speed limit of the machine, and clamps the moving speed of the superimposed axis to the speed limit of the machine.

For instance, in the case where the superimposed control is performed on the reference axis ZIm and the superimposed axis ZIIs in FIG. 1, suppose that when such a command is issued as to operate the workpiece 1 at a predetermined speed vm1 on the reference axis ZIm, such a command is issued as to operate the second tool 4 at a speed vs2 on the superimposed axis ZIIs, as is illustrated in FIG. 7. The numerical controller compares the speed vm1+vs2 after the acceleration of the superimposed axis ZIIs, with the speed limit vmax of the superimposed axis ZIIs. When determining that the speed vm1+vs2 after the acceleration is higher than the speed limit vmax, the numerical controller decelerates the speed of the reference axis ZIm to vm2, and controls the speed vm2+vs2 after the acceleration of the superimposed axis ZIIs so as not to exceed the speed limit vmax.

However, in the case where while the speed of any one axis of the reference axis and the superimposed axis is reduced in a deceleration state until reaching a target speed, the other axis having a superimposition relationship with the one axis is accelerated, suppose that the acceleration time period of the above described accelerated other axis is shorter than the deceleration time period of the decelerated one axis. Such a phenomenon occurs that the moving speed of the superimposed axis exceeds the speed limit of the machine during this acceleration/deceleration interval.

For instance, in the case where the superimposed control is performed on the reference axis ZIm and the superimposed axis ZIIs in FIG. 1, suppose that a control of deceleration is performed on the reference axis ZIm so that the speed vm2+vs2 after the acceleration of the superimposed axis ZIIs does not exceed the speed limit vmax, as is illustrated in FIG. 8. In this case, a time period equal to (tm2−tm1) is needed to decelerate the reference axis ZIm from vm1 to vm2. However, when the superimposed axis ZIIs is rapidly accelerated in this deceleration interval, in other words, when the time period (ts2−ts1) required for accelerating the superimposed axis ZIIs is shorter than the time period (tm2−tm1) required for decelerating the reference axis ZIm, the deceleration of the reference axis ZIm is not in time for the acceleration of the superimposed axis ZIIs. As a result, the speed projection occurs in the moving speed of the superimposed axis ZIIs as in the graph of "moving speed of superimposed axis ZIIs" in FIG. 8, and the moving speed of the superimposed axis occasionally exceeds the speed limit vmax of the machine.

Such a phenomenon tends to easily occur when two axes particularly having the superimposition relationship with each other are operated by a combination of a rapid traverse and a cutting feed, because the deceleration time period and the acceleration time period are different in many cases and such a situation tends to easily occur that the deceleration is not in time.

SUMMARY OF THE INVENTION

An object of the present invention is, therefore, to provide a numerical controller which performs control for preventing instantaneous speed projection that occurs while a reference axis or a superimposed axis is accelerated and/or decelerated, due to a difference between an acceleration time period and a deceleration time period.

The numerical controller according to the present invention has a first axis which is determined to be a reference axis and a second axis which is determined to be a superimposed axis different from the first axis, and performs superimposed control which superimposes a movement amount of the reference axis on a movement amount of the superimposed axis, and thereby controls the movement of the superimposed axis. This numerical controller includes an acceleration start time control unit which controls an acceleration start time of an axis to be accelerated in a superimposition interval in which one of the reference axis and the superimposed axis is accelerated and the other axis thereof is decelerated.

The acceleration start time control unit can include: an acceleration/deceleration combination determining portion which determines respective combinations of acceleration and deceleration of the reference axis and the superimposed axis; an acceleration/deceleration time comparing portion that compares a time period during which the axis to be accelerated is accelerated, with a time period during which the axis to be decelerated is decelerated in a case where the acceleration/deceleration combination determining portion determines that one of the reference axis and the superimposed axis is accelerated and the other axis thereof is decelerated; a speed limit excess determining portion which determines whether a moving speed of the superimposed axis exceeds a speed limit of the superimposed axis in a case where the acceleration/deceleration time comparing portion determines that the time period for deceleration is longer than the time period for acceleration; and a speed control portion which excludes the movement amount contributing to the acceleration from the movement amount of the superimposed axis in a case where the speed limit excess determining portion determines that the moving speed of the superimposed axis exceeds the speed limit of the superimposed axis.

The acceleration start time control unit may be configured so as to also control, when controlling the acceleration start time of the axis to be accelerated, an acceleration start time of another axis having no superimposition relationship, at the same time.

The present invention can provide a numerical controller that delays the acceleration start time of the axis to be accelerated, in the superimposition interval in which one of the reference axis and the superimposed axis is accelerated and the other axis thereof is decelerated, and thereby performs control for preventing instantaneous speed projection that occurs while the reference axis or the superimposed axis is accelerated and/or decelerated, due to a difference between an acceleration time period and a deceleration time period.

BRIEF DESCRIPTION OF THE DRAWINGS

The above and other objects and features of the present invention will become apparent from the description of embodiments with reference to the attached drawings, in which.

DETAILED DESCRIPTION OF THE PREFERRED EMBODIMENTS

In the present invention, a numerical controller determines whether a present interval is a superimposition interval of acceleration/deceleration, in which one of a reference axis and a superimposed axis (for instance, superimposed axis) is accelerated and the other axis thereof (for instance, reference axis) is decelerated, and calculates an acceleration time period of the one axis to be accelerated and a deceleration time period of the other axis to be decelerated. The numerical controller then compares the calculated acceleration time period with the deceleration time period, and when the deceleration time period is longer than the acceleration time period, compares the moving speed of the superimposed axis which is being accelerated or decelerated, with the speed limit of the machine. As a result of comparison, when the moving speed of the superimposed axis is higher than the speed limit of the machine, the numerical controller excludes a moving pulses contributing to the acceleration, and makes the acceleration wait for the next execution processing. As a result, after the axis to be decelerated is sufficiently decelerated, the axis to be accelerated is accelerated, and the moving speed of the superimposed axis does not exceed the speed limit of the machine in the acceleration/deceleration interval.

One embodiment of the numerical controller according to the present invention will be described below with reference to FIG. 3 to FIG. 5.

Figure 1:
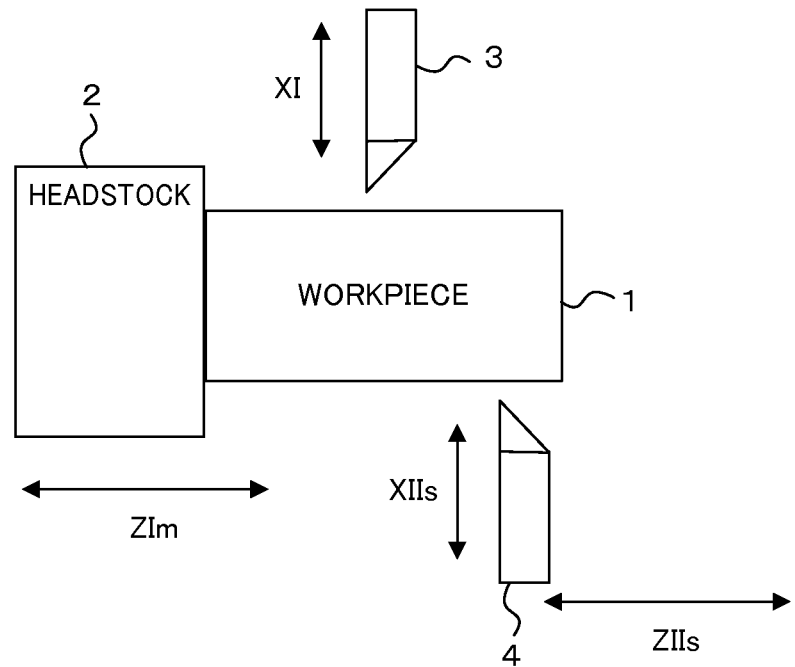
FIG. 1 is an explanatory view for one example of a machine tool to which superimposed control is applied.

A numerical controller 10 has two sets of control axis systems which are formed of two axes of an X axis and a Z axis as shown in FIG. 1, and is configured so as to control a lathe machine tool while using one axis as a first path (XI and ZIm) and the other axis as a second path (XIIs and ZIIs).

Figure 3:
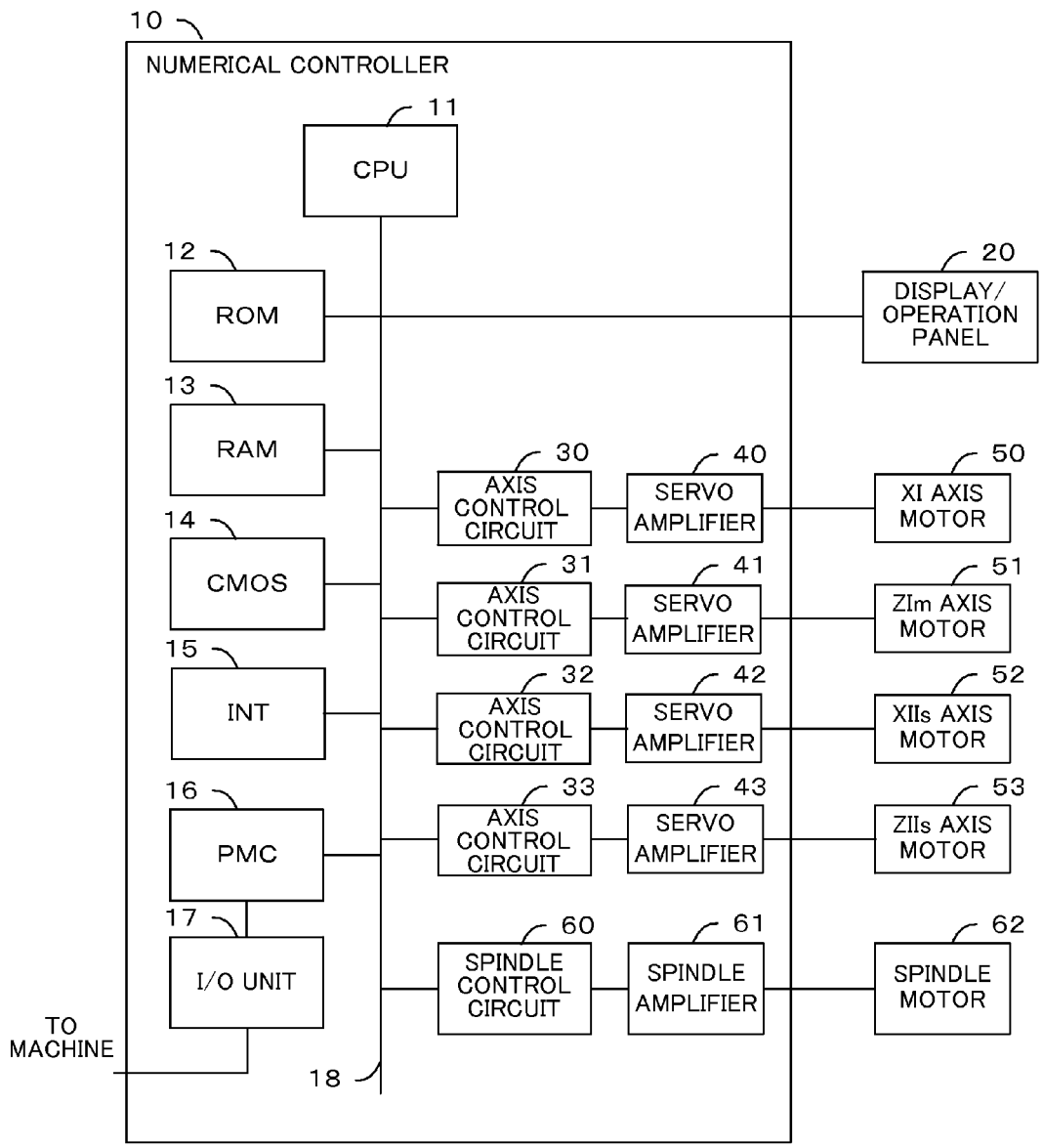
FIG. 3 is a block diagram of essential parts in one embodiment of a numerical controller according to the present invention.

FIG. 3 is a block diagram of essential parts of a numerical controller 10, and the whole of this numerical controller 10 is controlled by a CPU 11. The CPU 11 reads out a system program stored in a ROM 12 through a bus 18, and controls the whole of the numerical controller according to the read-out system program. A RAM 13 stores temporary calculation data and display data, and the various data therein input by an operator through a display/operation panel 20. A CMOS memory 14 is configured so as to be backed up by a battery (not shown) and function as a nonvolatile memory which holds a storage state even when a power supply of the numerical controller 10 is turned off. The CMOS memory 14 stores a working program read through an interface 15, a working program input through the display/operation panel 20, and the like, therein.

The interface 15 enables the connection between the numerical controller 10 and an external device. A PMC (programmable machine controller) 16 outputs a signal to an auxiliary apparatus of a machine tool (not shown) through an I/O unit 17 according to a sequence program built in the numerical controller 10, and controls the machine tool. The PMC 16 also receives signals sent from various switches of an operation panel equipped in the main body of the machine tool, and the like, subjects the signals to necessary signal processing, and then delivers the processed signals to the CPU 11. The display/operation panel 20 is a manual data input apparatus which includes a display of a liquid crystal, a CRT or the like, a keyboard, and the like.

Figure 2:
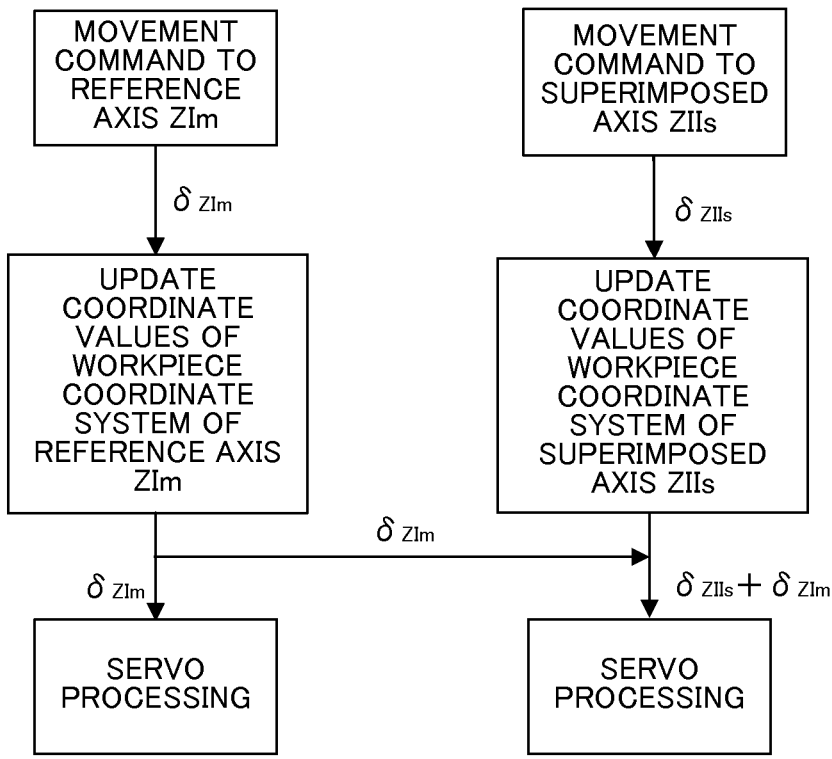
FIG. 2 is an explanatory view for the superimposed control which is performed on the machine tool in FIG. 1.

Axis control circuits 30 to 33 of the X axis and the Z axis which move a first tool 3, a second tool 4 and a workpiece 1 (for more information, XI axis which is X axis that moves the first tool 3, ZIm axis which is Z axis that moves the workpiece 1, and XIIs axis and ZIIs axis which are X axis and Z axis that move the second tool 4) receive a command of a movement amount of each of the axes sent from the CPU 11, and outputs the commands to the respective axes to servo amplifiers 40 to 43. The servo amplifiers 40 to 43 receive these commands, and drive servo motors 50 to 53 of respective axes (specifically, XI axis, ZIm axis, XIIs axis and ZIIs axis). The servo motors 50 to 53 of respective axes each have a position/speed detector built-in, feedback a position/speed feedback signal sent from this position/speed detector to the axis control circuits 30 to 33, respectively, and perform feedback control for the positions/speeds. Incidentally, in FIG. 2, the description of the feedback of the position/speed is omitted.

In addition, a spindle control circuit 60 performs speed control based on a spindle speed signal and a feedback signal which is sent from a position detector (not shown), outputs a signal of the resultant spindle speed to a spindle amplifier 61, and controls the speed of a spindle motor 62.

The configuration of the numerical controller as described above is a known configuration.

In the superimposed control, the CPU 11 reads out the movement amounts of each of the axes and the superimposition relationships among each of the axes which are temporarily stored in the RAM 13, and delivers commands of movement amounts in which the movement amount commanded to the reference axis is superimposed on the movement amounts of each of the axes, to the axis control circuits 30 to 33 of superimposed axis, respectively. An operation example of a numerical controller 10 in the case where the superimposed axis ZIIs is accelerated and the reference axis ZIm is decelerated, in the numerical controller having such a configuration, will be described below with reference to FIG. 4.

Figure 4:
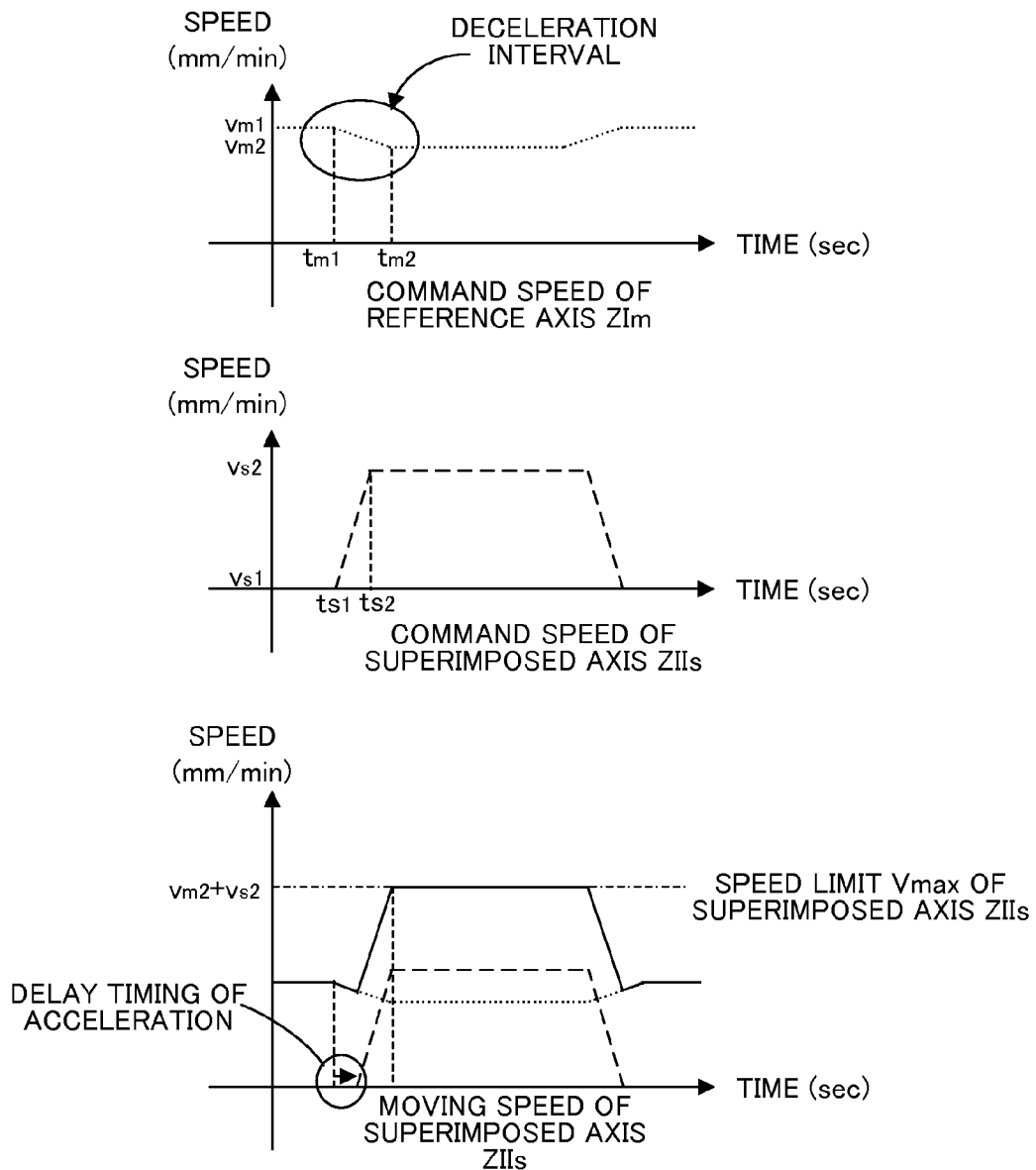
FIG. 4 is a graph showing a change in moving speed of each axis which is controlled by the numerical controller in FIG. 3.
Figure 5:
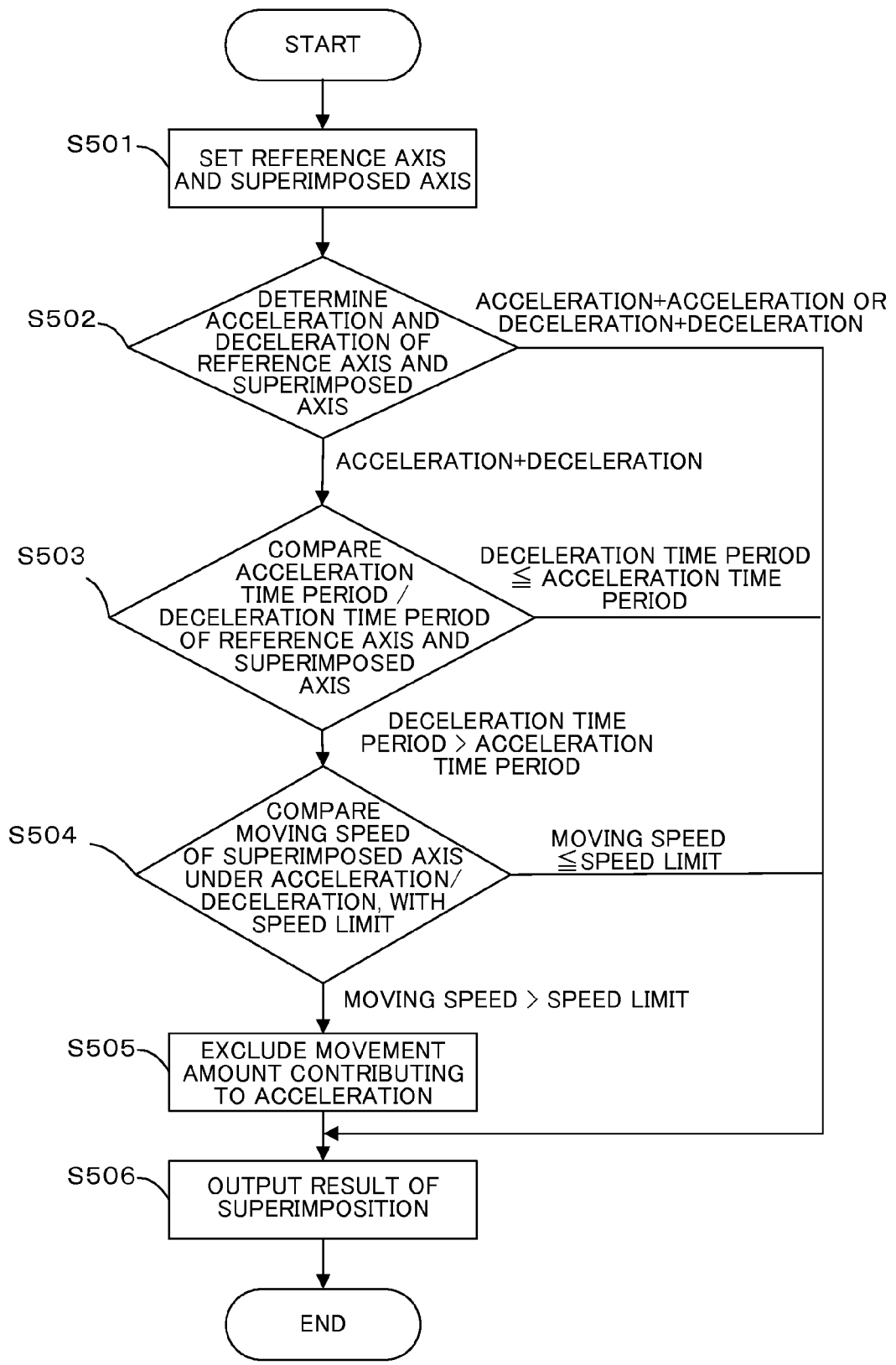
FIG. 5 is a flow chart showing a procedure of processing of the superimposed control which is executed by the numerical controller in FIG. 3.
Figure 6:
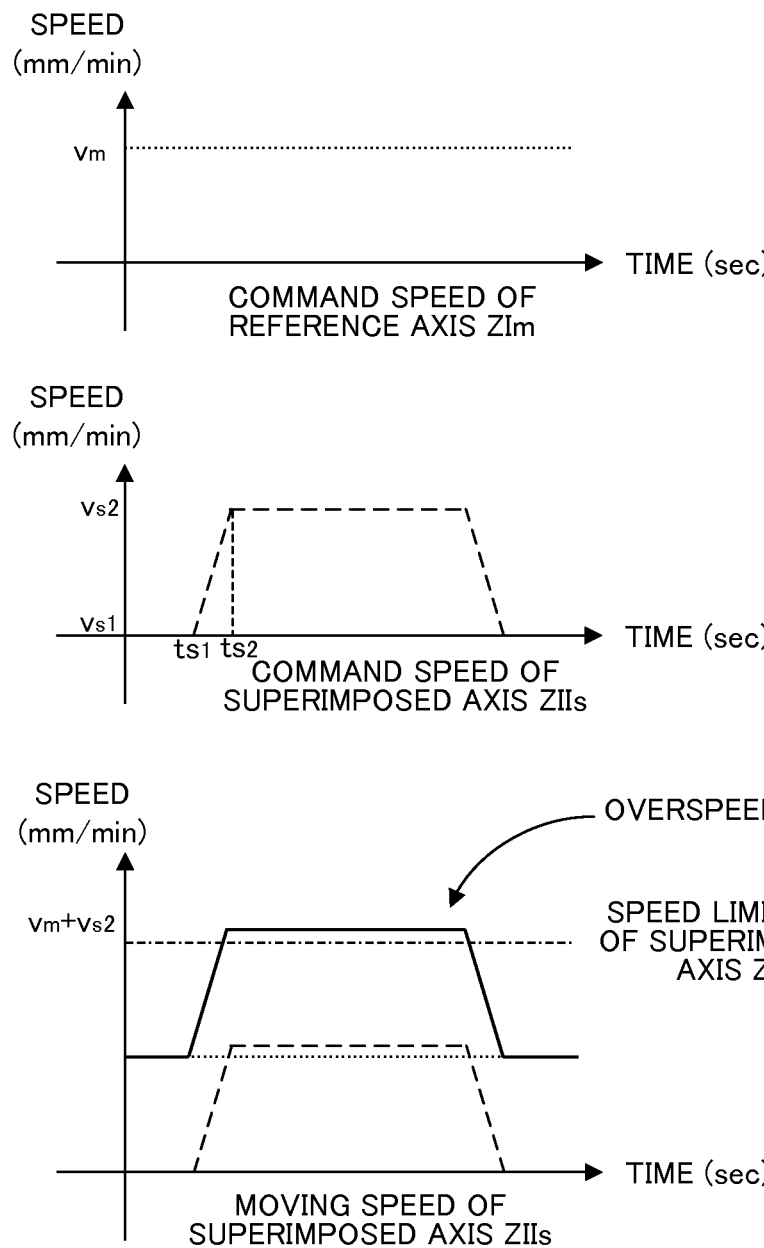
FIG. 6 is a graph showing a change of moving speeds of each axis in general superimposed control.
Figure 7:
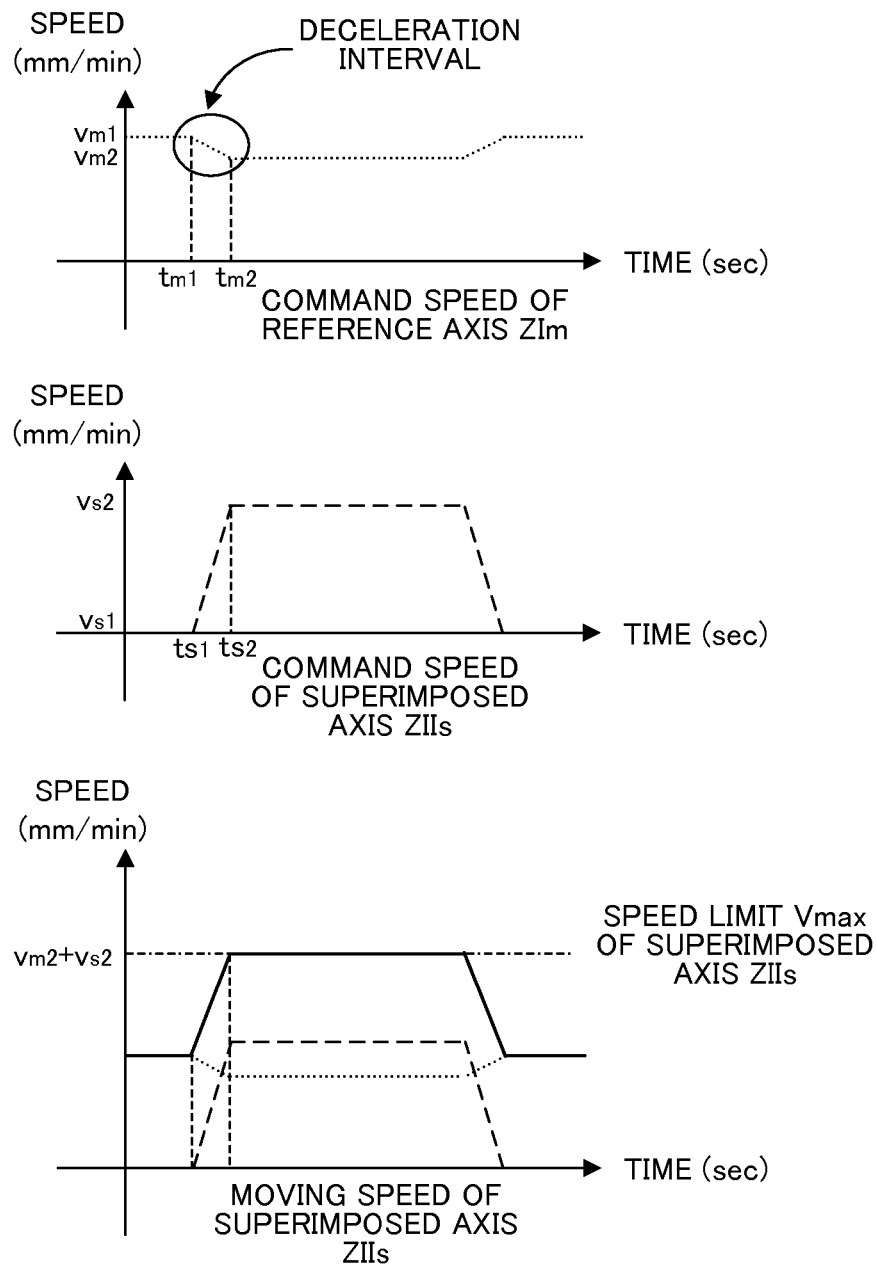
FIG. 7 is a graph showing a change in moving speed of each axis in superimposed control according to a conventional technology.
Figure 8:
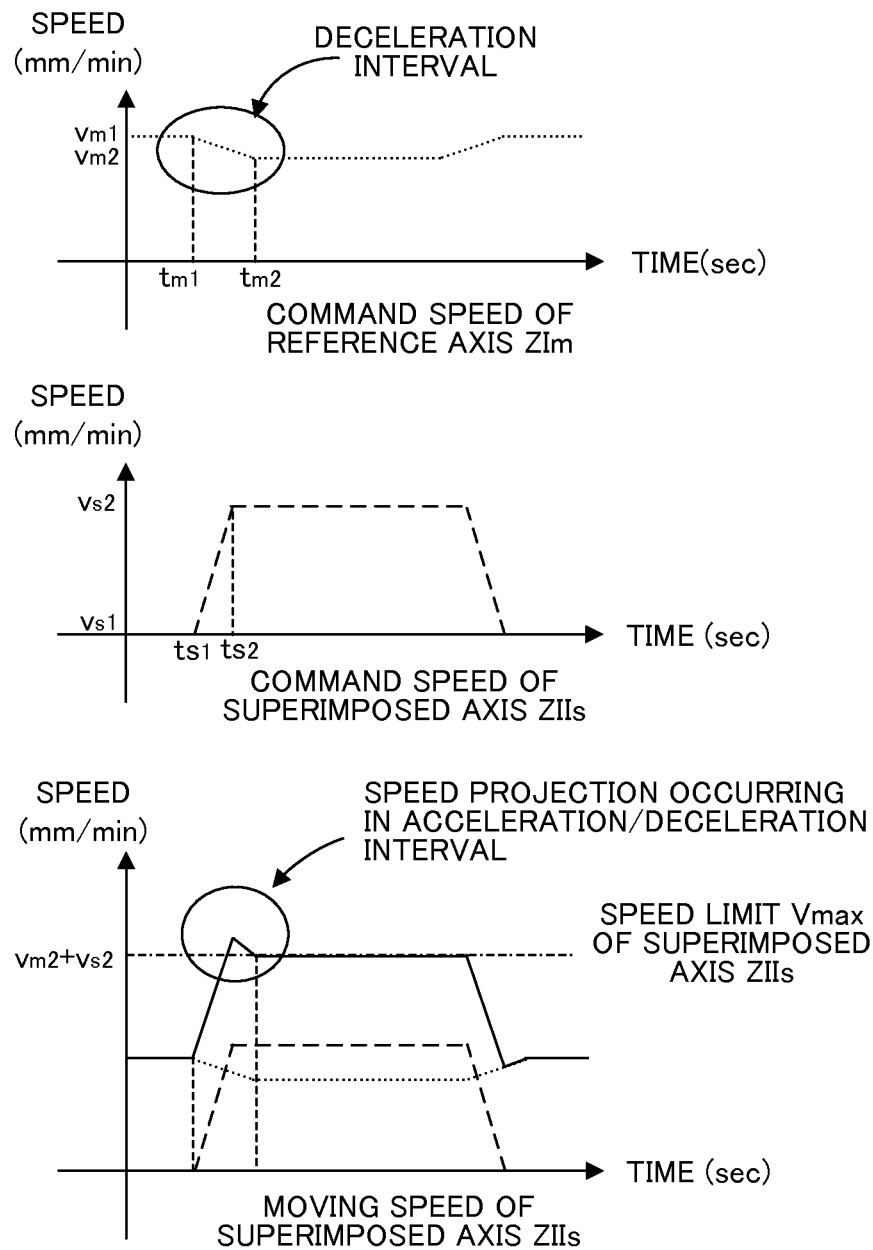
FIG. 8 is a graph showing speed projection which occurs in superimposed control according to a conventional technology.

FIG. 4 illustrates an example in which a time period (tm2−tm1) required for the deceleration of the reference axis ZIm is longer than a time period (ts2−ts1) required for accelerating the speed of the superimposed axis ZIIs from vs1 to vs2, in the case where the reference axis ZIm is decelerated in response to the acceleration of the superimposed axis ZIIs based on a movement command, while the reference axis ZIm and the superimposed axis ZIIs are subjected to the superimposed control. In such a situation, in a conventional example, speed projection has occurred in the moving speed of the superimposed axis ZIIs, as is illustrated in FIG. 8.

The numerical controller 10 of FIG. 3 controls the axis control circuit 33, when determining that when the superimposed axis ZIIs is rapidly accelerated from vs1 to vs2 in the deceleration interval tm1 to tm2 of the reference axis ZIm, the moving speed of the superimposed axis ZIIs exceeds the speed limit vmax, so as to await the start of the acceleration until the reference axis ZIm is sufficiently decelerated to such a degree that the moving speed of the superimposed axis ZIIs does not exceed the speed limit vmax even though the moving speed of the superimposed axis ZIIs is accelerated to vs2. It is grasped from the graph of "moving speed of superimposed axis ZIIs" in FIG. 4 that the moving speed of the superimposed axis ZIIs does not exceed the speed limit vmax by being controlled in the above way, and that the moving speeds of the reference axis ZIm and the superimposed axis ZIIs become constant speeds at the same time when the acceleration of the superimposed axis ZIIs is completed.

The procedure of the processing of the superimposed control which is executed by the numerical controller 10 of FIG. 3 will be described below with reference to a flow chart of FIG. 5.

In the superimposed control processing by the numerical controller 10, firstly, the reference axis ZIm which is determined to be a reference, and the superimposed axis ZIIs on which movement amount is superimposed, are set (S501). Next, the numerical controller 10 determines respective combinations of acceleration and deceleration of the reference axis ZIm and the superimposed axis ZIIs (S502). The combinations of the acceleration and the deceleration of the reference axis ZIm and the superimposed axis ZIIs are as follows.

(1) Reference axis ZIm is accelerated, and superimposed axis ZIIs is also accelerated.

(2) Reference axis ZIm is accelerated, whereas superimposed axis ZIIs is decelerated (3) Reference axis ZIm is decelerated, whereas superimposed axis ZIIs is accelerated (4) Reference axis ZIm is in deceleration, and superimposed axis ZIIs is also decelerated In the case where the reference axis ZIm is accelerated and the superimposed axis ZIIs is also accelerated (combination (1) above), or the reference axis ZIm is decelerated and the superimposed axis ZIIs is also decelerated (combination (4) above), as a result of the determination of the combinations of acceleration and deceleration in the step S502, instantaneous speed projection does not occur, and accordingly a result of superimposition in which the movement amount of the reference axis ZIm is superimposed on the superimposed axis ZIIs is output to the servo motor (S506), and the processing of the superimposed control ends.

On the other hand, in the case where the reference axis ZIm is accelerated and the superimposed axis ZIIs is decelerated (combination (2) above), or the reference axis ZIm is decelerated and the superimposed axis ZIIs is accelerated (combination (3) above), as a result of the determination of the combinations of acceleration and deceleration in the step S502, next, the acceleration time period and the deceleration time period or the deceleration time period and the acceleration time period of the reference axis ZIm and the superimposed axis ZIIs are compared with each other (S503). Incidentally, the acceleration time period and the deceleration time period of the reference axis ZIm and the superimposed axis ZIIs are set for each of the axes as acceleration/deceleration time constants, in the RAM 13 or the CMOS memory 14 in the numerical controller.

When the time period required for the deceleration of the axis to be decelerated (for instance, superimposed axis ZIIs) is equal to or shorter than the time period required for the acceleration of the axis to be accelerated (for instance, reference axis ZIm), as a result of the comparison of the acceleration time period and the deceleration time period in the step S503, the axis to be accelerated is sufficiently decelerated by the axis to be decelerated before the acceleration, and instantaneous speed projection does not occur. Accordingly, a result of superimposition of the movement amount of the reference axis ZIm on the superimposed axis ZIIs is output to the servo motor (S506), and the processing of the superimposed control ends.

On the other hand, when the time period required for the deceleration of the axis to be decelerated (for instance, superimposed axis ZIIs) is longer than the time period required for the acceleration of the axis to be accelerated (for instance, reference axis ZIm), as a result of the comparison of the acceleration time period and the deceleration time period in the step S503, there is a possibility that the instantaneous speed projection occurs. Accordingly, the moving speed of the superimposed axis ZIIs during the acceleration/the deceleration is compared with the speed limit vmax (S504).

As a result of the comparison of the moving speed of the superimposed axis ZIIs with the speed limit vmax in the step S504, when the moving speed of the superimposed axis ZIIs is equal to or less than the speed limit vmax, a result of superimposition of the reference axis ZIm on the superimposed axis ZIIs is output to the servo motor (S506), and the processing of the superimposed control ends.

On the other hand, as a result of the comparison of the moving speed of the superimposed axis ZIIs with the speed limit vmax in the step S504, when the moving speed of the superimposed axis ZIIs exceeds the speed limit vmax, a movement amount contributing the acceleration is excluded (S505), then a result of superimposition of the movement amount of the reference axis ZIm on the superimposed axis ZIIs is output to the servo motor (S506), and the processing of the superimposed control ends.

Incidentally, the start of the movement of the reference axis or the superimposed axis is delayed by the time period during which the acceleration is waited. However, by similarly delaying operations of other axes which do not have a superimposition relationship in synchronization with the reference axis or the superimposed axis, the numerical controller can maintain the synchronization of these operations at the time before delaying the start of the movement. For instance, in the case where the workpiece 1 is worked by a machine tool illustrated in FIG. 1 according to the control of the numerical controller 10 having a speed limit function in FIG. 3, when the start of the movement of the reference axis ZIm is delayed, the numerical controller 10 also controls the operation of the XI axis of the first tool 3 so as to delay the operation in response to the delay of the reference axis ZIm, and can thereby maintain the synchronization of the operations at the time before delaying the start of the movement.

What is claimed is:

1. A numerical controller that has a first axis which is determined to be a reference axis and a second axis which is determined to be a superimposed axis different from the first axis, and performs superimposed control which superimposes a movement amount of the reference axis on a movement amount of the superimposed axis, and thereby controls the movement of the superimposed axis, comprising:
   an acceleration start time control unit which controls an acceleration start time of an axis to be accelerated in a superimposition interval in which the reference axis is accelerated and the superimposed axis is decelerated;
   wherein the acceleration start time control unit comprises:
      an acceleration/deceleration combination determining portion which determines respective combinations of acceleration and deceleration of the reference axis and the superimposed axis;
      an acceleration/deceleration time comparing portion that compares a time period during which the reference axis is accelerated, with a time period during which the superimposed axis is decelerated in a case where the acceleration/deceleration combination determining portion determines that the reference axis is accelerated and the superimposed axis is decelerated;
      a speed limit excess determining portion which determines whether a moving speed of the superimposed axis exceeds a speed limit of the superimposed axis in a case where the acceleration/deceleration time comparing portion determines that the time period for deceleration is longer than the time period for acceleration; and
      a speed control portion which excludes the movement amount contributing to the acceleration from the movement amount of the superimposed axis in a case where the speed limit excess determining portion determines that the moving speed of the superimposed axis exceeds the speed limit of the superimposed axis.

2. The numerical controller according to claim 1, wherein the acceleration start time control unit is configured so as to also control, when controlling the acceleration start time of the reference axis, an acceleration start time of another axis having no superimposition relationship, at the same time.

3. A numerical controller that has a first axis which is determined to be a reference axis and a second axis which is determined to be a superimposed axis different from the first axis, and performs superimposed control which superimposes a movement amount of the reference axis on a movement amount of the superimposed axis, and thereby controls the movement of the superimposed axis, comprising:

an acceleration start time control unit which controls an acceleration start time of an axis to be accelerated in a superimposition interval in which the superimposed axis is accelerated and the reference axis thereof is decelerated;

wherein the acceleration start time control unit comprises:

an acceleration/deceleration combination determining portion which determines respective combinations of acceleration and deceleration of the reference axis and the superimposed axis;

an acceleration/deceleration time comparing portion that compares a time period during which the superimposed axis is accelerated, with a time period during which the reference axis is decelerated in a case where the acceleration/deceleration combination determining portion determines that the superimposed axis is accelerated and the reference axis is decelerated;

a speed limit excess determining portion which determines whether a moving speed of the superimposed axis exceeds a speed limit of the superimposed axis in a case where the acceleration/deceleration time comparing portion determines that the time period for deceleration is longer than the time period for acceleration; and a speed control portion which excludes the movement amount contributing to the acceleration from the movement amount of the superimposed axis in a case where the speed limit excess determining portion determines that the moving speed of the superimposed axis exceeds the speed limit of the superimposed axis.

4. The numerical controller according to claim 3, wherein the acceleration start time control unit is configured so as to also control, when controlling the acceleration start time of the superimposed axis, an acceleration start time of another axis having no superimposition relationship, at the same time.

* * * * *